US008856753B2

(12) United States Patent
Varadarajulu

(10) Patent No.: US 8,856,753 B2
(45) Date of Patent: Oct. 7, 2014

(54) GRANULAR MEASUREMENT OF PROCESSOR PERFORMANCE IN EXECUTING SECTIONS OF SOFTWARE CODE

(75) Inventor: Gopikrishnan Varadarajulu, Kundanahalli (IN)

(73) Assignee: International Business Machines Corporation, Armonk, NY (US)

( * ) Notice: Subject to any disclaimer, the term of this patent is extended or adjusted under 35 U.S.C. 154(b) by 1302 days.

(21) Appl. No.: 12/105,656

(22) Filed: Apr. 18, 2008

(65) Prior Publication Data

US 2009/0265691 A1    Oct. 22, 2009

(51) Int. Cl.
*G06F 9/44* (2006.01)
*G06F 11/34* (2006.01)

(52) U.S. Cl.
CPC ........ *G06F 11/3419* (2013.01); *G06F 11/3471* (2013.01); *G06F 2201/88* (2013.01); *G06F 2201/865* (2013.01); *G06F 9/4426* (2013.01)
USPC .......................................... 717/127; 717/130

(58) Field of Classification Search
USPC .................................. 717/127, 128, 120, 131
See application file for complete search history.

(56) References Cited

U.S. PATENT DOCUMENTS

| 5,732,272 A * | 3/1998 | Gochee | 717/128 |
| 5,832,270 A * | 11/1998 | Laffra et al. | 717/125 |
| 5,903,757 A * | 5/1999 | Gretz et al. | 717/127 |
| 5,950,003 A * | 9/1999 | Kaneshiro et al. | 717/130 |
| 6,332,212 B1 * | 12/2001 | Organ et al. | 717/128 |
| 6,539,501 B1 * | 3/2003 | Edwards | 714/45 |
| 2001/0011370 A1 * | 8/2001 | Gunter et al. | 717/4 |
| 2003/0182654 A1 * | 9/2003 | Dmitriev | 717/151 |
| 2004/0059867 A1 * | 3/2004 | Heinemann | 711/112 |
| 2005/0086451 A1 * | 4/2005 | Yates et al. | 712/32 |
| 2005/0172196 A1 * | 8/2005 | Osecky et al. | 714/746 |
| 2006/0048106 A1 * | 3/2006 | Citron et al. | 717/136 |
| 2006/0112374 A1 * | 5/2006 | Oliva | 717/127 |
| 2009/0019249 A1 * | 1/2009 | Kessler | 711/170 |

OTHER PUBLICATIONS

David R. Crowe; "NovAtel's Novel Approach to CPU Usage Measurement"; Software—Practice and Experience; May 1991; pp. 465-477; vol. 21(5); John Wiley & Sons, Ltd.
Abbas Rafii, "Structure and Application of a Measurement Tool—Sampler/3000"; Proceedings of ACM Sigmetrics Conference on Measuring and Modeling of Computer Systems; 1981; pp. 110-120.

* cited by examiner

*Primary Examiner* — Anna Deng
(74) *Attorney, Agent, or Firm* — Sughrue Mion, PLLC

(57) ABSTRACT

Processor performance in executing a section of software code is measured. A clock associated with the section of software code. It is detected that the section of software code is beginning to be executed. In response, the clock associated with the section of software code is started. It is then detected that the section of software code is no longer being executed. In response, the clock associated with the section of software code is stopped. The clock is stopped and restarted as the section of software code temporarily stops execution to cede control to other sections of software code. Ultimately, a value of the clock associated with the section of software code is output, where the value corresponds to the processor performance in executing the section of software code.

24 Claims, 6 Drawing Sheets

GRANULAR MEASUREMENT OF PROCESSOR PERFORMANCE IN EXECUTING SECTIONS OF SOFTWARE CODE

FIELD OF THE INVENTION

The present invention relates generally to measuring processor performance when a processor executes sections of software code, and more particularly to granularly measuring such processor performance.

BACKGROUND OF THE INVENTION

Modern complex computing systems typically involve large numbers of computing devices, with large numbers of processors that are executing large numbers of computer programs. Measuring the performance of such a computing system is important to ensure that response time and availability rate are within specified parameters. For instance, a user should not have to wait more than a predetermined length of time after issuing a request to the computing system, and, at any given time, a predetermined percentage of processors or servers should be available for processing such requests.

Existing approaches to measuring the performance of computing systems can indicate which processors of which computing devices are currently experiencing high usage. However, such performance measurement often begs the question as to why this high usage is occurring. That is, in order to effectively respond to the indication that a given processor of a given computing device is experiencing high usage, it can be important to know what computer program—and indeed what code section of which computer program—is causing such high usage.

This and other shortcomings of the prior art are addressed by the present invention.

SUMMARY OF THE INVENTION

The present invention relates to granularly measuring processor performance in executing sections of software code. A method of an embodiment of the invention resets a clock associated with a section of software code. The method may be implemented as one or more computer programs stored on a computer-readable medium, such as a recordable data storage medium. The method detects that the section of software code is beginning to be executed. In response, the clock associated with the section of software code is started.

The method thereafter detects that the section of software code is no longer being executed. In response, the clock associated with the section of software code is stopped. The clock is stopped and restarted as the section of software code temporarily stops execution to cede control to other sections of software code. Ultimately, a value of the clock is output. This value corresponds to the processor performance in executing the section of software code—specifically how long the processor has taken to execute the section of software code.

A system of an embodiment of the invention includes one or more processors, a storage device, and a mechanism. The storage device stores one or more computer programs that have one or more sections of software code for which performance of the processors is to be measured. The mechanism, for each section of software code, maintains a clock corresponding to how long the section of software code has been executed by the processors. Still other embodiments and aspects of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview and General Method

Figure 1:
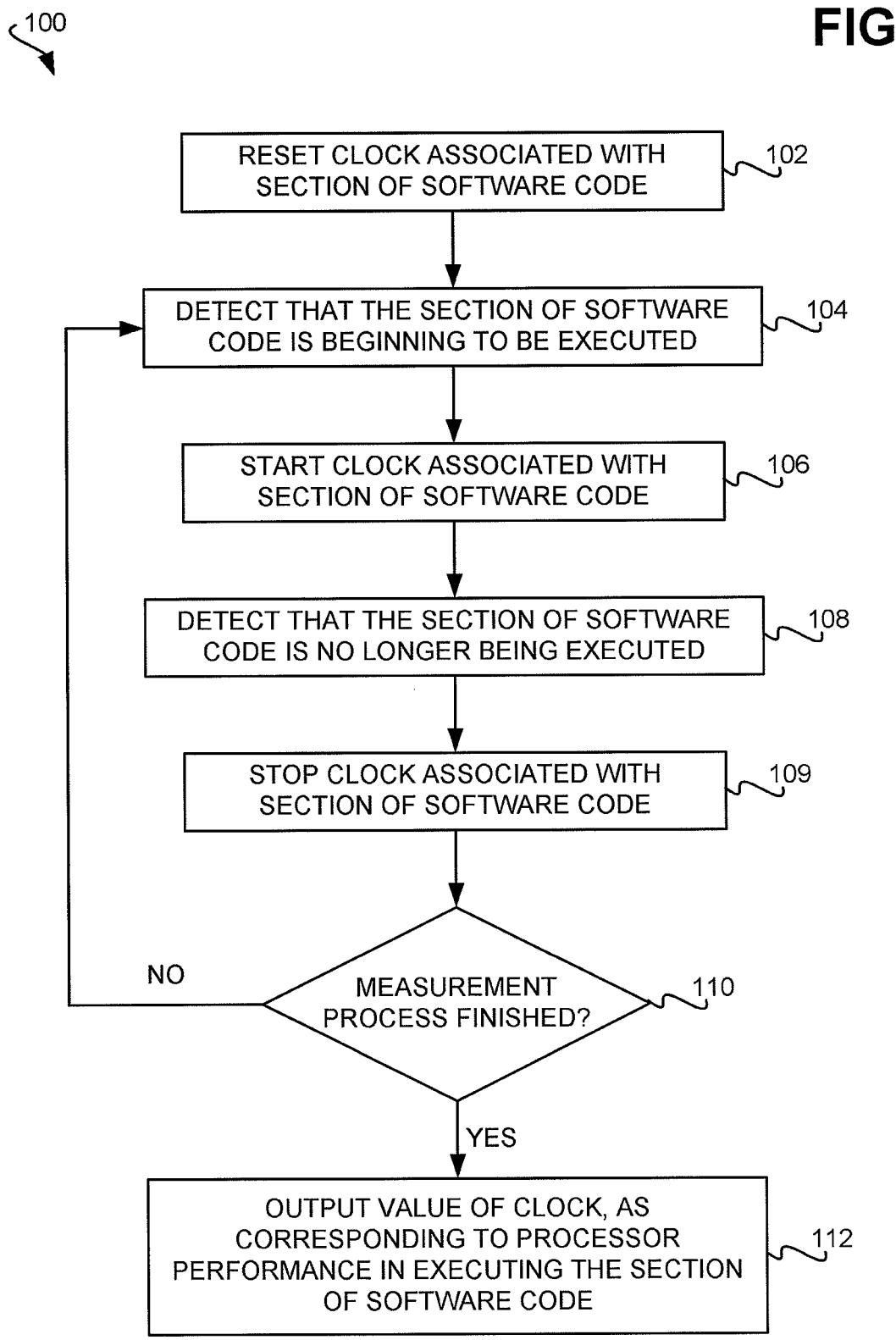
FIG. 1 is a flowchart of a method for measuring processor performance in executing a section of software code, according to an embodiment of the invention.

FIG. 1 shows a method for measuring the performance of a processor executing a section of software code, according to a general embodiment of the invention. As is described in the next sections of the detailed description, how a section of software code has its beginning and end demarcated can be achieved in a number of different ways. For example, a computer program, a complete routine of a computer program that is called by other parts of the computer program, as well as arbitrarily portions of software code can all be considered sections of software code as this terminology is used herein.

A clock associated with the section of software code is initially reset (102). The clock may be associated with and may be implemented within a particular processor, such that the clock is particularly a processor clock. In one embodiment, part 102 is performed after the first time part 104 is performed, instead of prior to part 104 being performed as depicted in FIG. 1. It is noted that there is a different (processor) clock associated with each section of software code in relation to which the method 100 is performed.

That the section of software code in question is beginning to be executed is detected (104). Different approaches as to how such detection can be achieved are described in subsequent sections of the detailed description. In response, the clock associated with the section of software code is started (106). Thereafter, that the section of software code is no longer being executed is detected (108). Again, different approaches as to how such detection can be achieved are described in subsequent sections of the detailed description. In response, the clock associated with the section of software code is stopped (109).

If the measurement process is not yet finished (110), then the method 100 repeats at part 104, where the clock is restarted when the section of software code is again detected as being executed by the processor (and not necessarily at the beginning thereof as with the first time the section of software code is detected as beginning execution), and is stopped when the section is again detected as no longer being executed. The measurement process may not yet be finished in a number of different ways. For instance, if the section of software code is a complete routine of a computer program, then the end of the routine, where it returns to the portion of the computer program that called the routine, may correspond to the measurement process being finished as to the current iteration of the section of software code.

Once the measurement process has finished (110), then the current value of the clock is output. This value corresponds to the processor performance in executing the section of software code. This value specifically indicates the length of time that the processor spent in executing this section of software code. Such output may include displaying the value for viewing by the user, printing the value for viewing by the user, and/or storing the value on a computer-readable medium for later examination and analysis by the user.

It is noted that granularity is achieved in the method 100 when measuring processor performance. For example, in one embodiment, when a given section of software code itself calls another section of software code, such as a routine in the same or a different computer program, it may be considered that the given section is no longer being executed. This is detected in part 108, such that the clock stops in part 109. When the called section of software code returns control to the given section of software code, such that the given section is again being executed, then this is detected in part 104 and the clock is restarted in part 106.

As such, just the total amount of time that the processor in question spent executing the instructions of the given section of software code itself—as opposed to executing the instructions of other sections of software code that this given section may have called during execution—is recorded. This provides users, such as developers, with a greater granularity as to which sections of software code are in actuality responsible for consuming the greatest percentage of a processor's processing time, in contradistinction to the prior art. For example, the prior art may be able to achieve a granularity in measuring processor performance just down to the process level. However, a given process can include a large number of sections of software code, such as a large number of routines, and such a coarse level of granularity is not as helpful in assisting developers understand what specific portions of a given computer program are responsible for causing a processor to have undesirably high usage.

Figure 2:
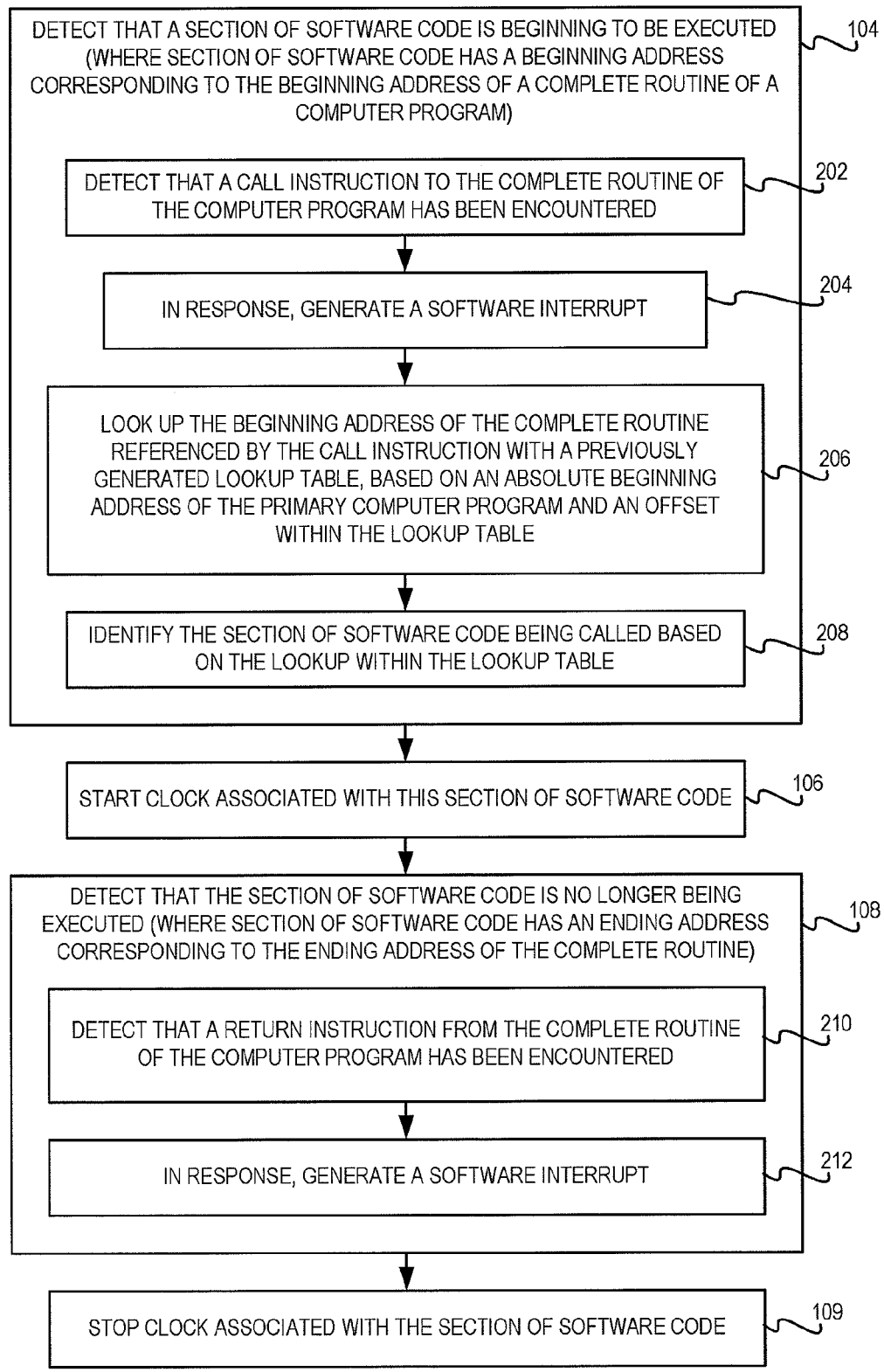
FIG. 2 is a flowchart of a method of an approach by which when a section of software code is beginning to be executed and when the section is no longer being executed can both be detected, according to an embodiment of the invention.

First Approach for Detecting When Software Code Section Starts and Stops Executing FIG. 2 shows a method 200 delineating a specific approach for detecting when execution of a software code section has started and when it has stopped, according to an embodiment of the invention. The method 200 particularly shows a specific approach for implementing parts 104 and 108 of the method 100 of FIG. 1. It is noted that in some embodiments, either part 104 and part 108 may be employed as shown in FIG. 2, and not necessarily both parts 104 and part 108 as shown in FIG. 2 may be employed in the same embodiment.

The section of software code in relation to which the method 200 is performed corresponds to a complete routine of a computer program. A complete routine may be a function, a method, or a subroutine of a program, for instance. A complete routine is identifiable by having a beginning address that is called to execute the routine, and an ending address at which there is a return instruction to return from the routine (i.e., to pass control and execution back to the caller). Such a section of software code is distinguished from a section in which the beginning and ending addresses of the section are arbitrarily specified, and do not correspond to the beginning and ending address of a complete routine of a computer program.

The method 200 thus detects that such a section of software code is beginning to be executed (104). This is achieved by detecting that a call instruction to the beginning address of the complete routine of the computer program has been encountered (202), such that in response a software interrupt is generated (204). The call instruction may be a branch (processor) instruction, which branches execution to the complete routine, such that once the complete routine reaches a return instruction, execution continues with the instruction following the branch instruction. Those of ordinary skill within the art can appreciate that some operating systems enable software interrupts to be generated in response to these types of call instructions being encountered. Thus, a software interrupt is generated in part 204 to cause parts 206, 208, and 106 to be performed. That is, the software interrupt interrupts calling of the complete routine to instead cede control (i.e., execution) to a different section of code implementing parts 206, 208, and 106.

Prior to starting the counter, in part 106, the identity of the complete routine (i.e., the section of software code in relation to which the method 200 is being performed) has to be determined. This is because there can be a number of different sections of software code for which processor performance is to be measured. Therefore, it has to be known which given section of software code has begun to be executed as a result of the software interrupt being generated in part 204. This is achieved by looking up the beginning address of the complete routine to which the given section of software code corresponds, as referenced by the call instruction in question, within a previously generated lookup table, based on the absolute beginning address of the computer program of which this routine is a part, and a relevant offset (206). The manner by which part 206 is performed is now described in more detail.

In general, when an instance of a computer program is executed, it occupies a portion of an address space of the computing device executing the program. Thus, for a given instance of a computer program, there is a (current) absolute beginning address of such a computer program. This beginning address is the first address of the portion of the address space occupied by the computer program. This beginning address is absolute in that it is an actual (physical or virtual)

address of the address space of the computing device. It is not, in other words, a relative or offset address.

Furthermore, when the call instruction is encountered in part 202, the (current) absolute beginning address of the section of software code that this call instruction is ceding control to is known. This is the beginning address of the section of software code within the present instance of the computer program being executed. It is also an absolute address, because it is specified as an actual address of the address space of the computing device in question, as opposed to a relative or offset address.

Figures 3, 4:
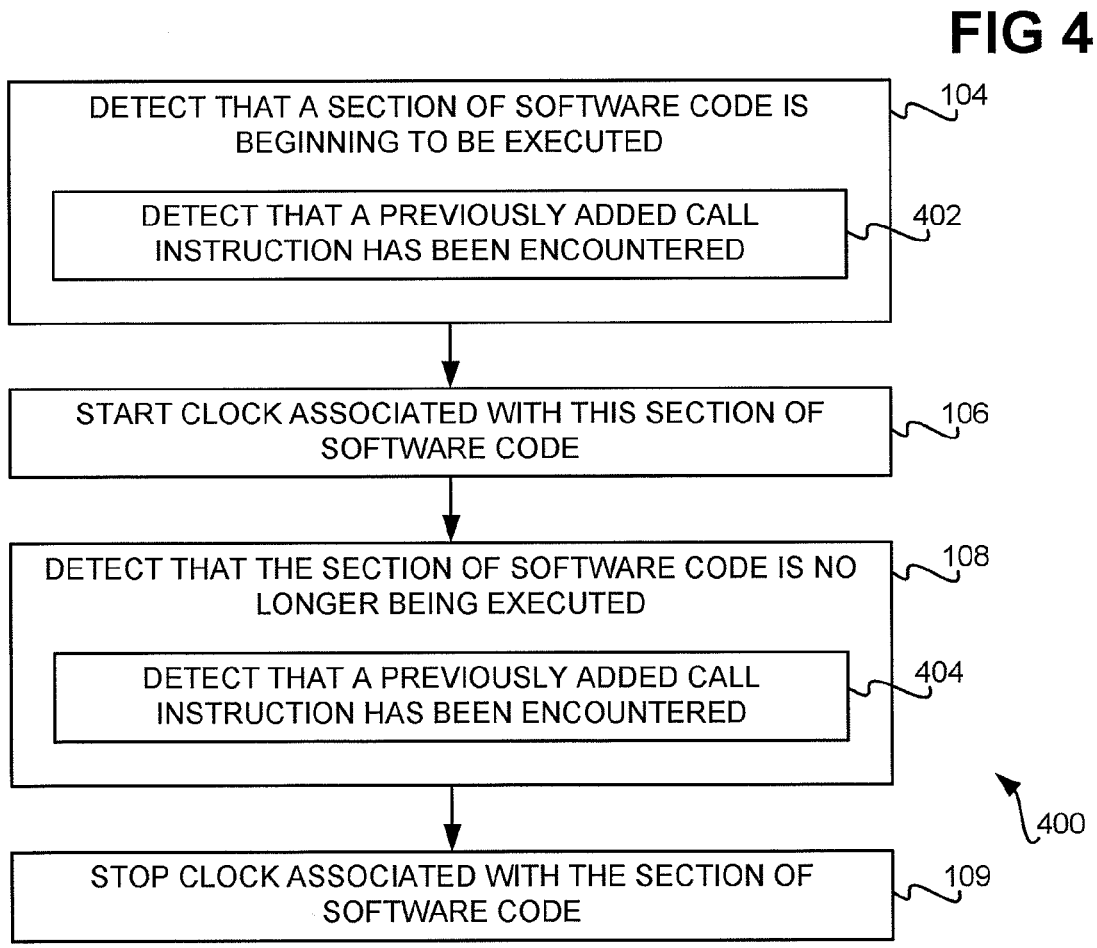
FIG. 3 is a flowchart is a diagram of a lookup table that can be used to identify the section of software code that has begun to be executed, according to an embodiment of the invention.
FIG. 4 is a flowchart of a method of another approach by which when a section of software code is beginning to be executed and when the section is no longer being executed can both be detected, according to an embodiment of the invention.
Figure 5:
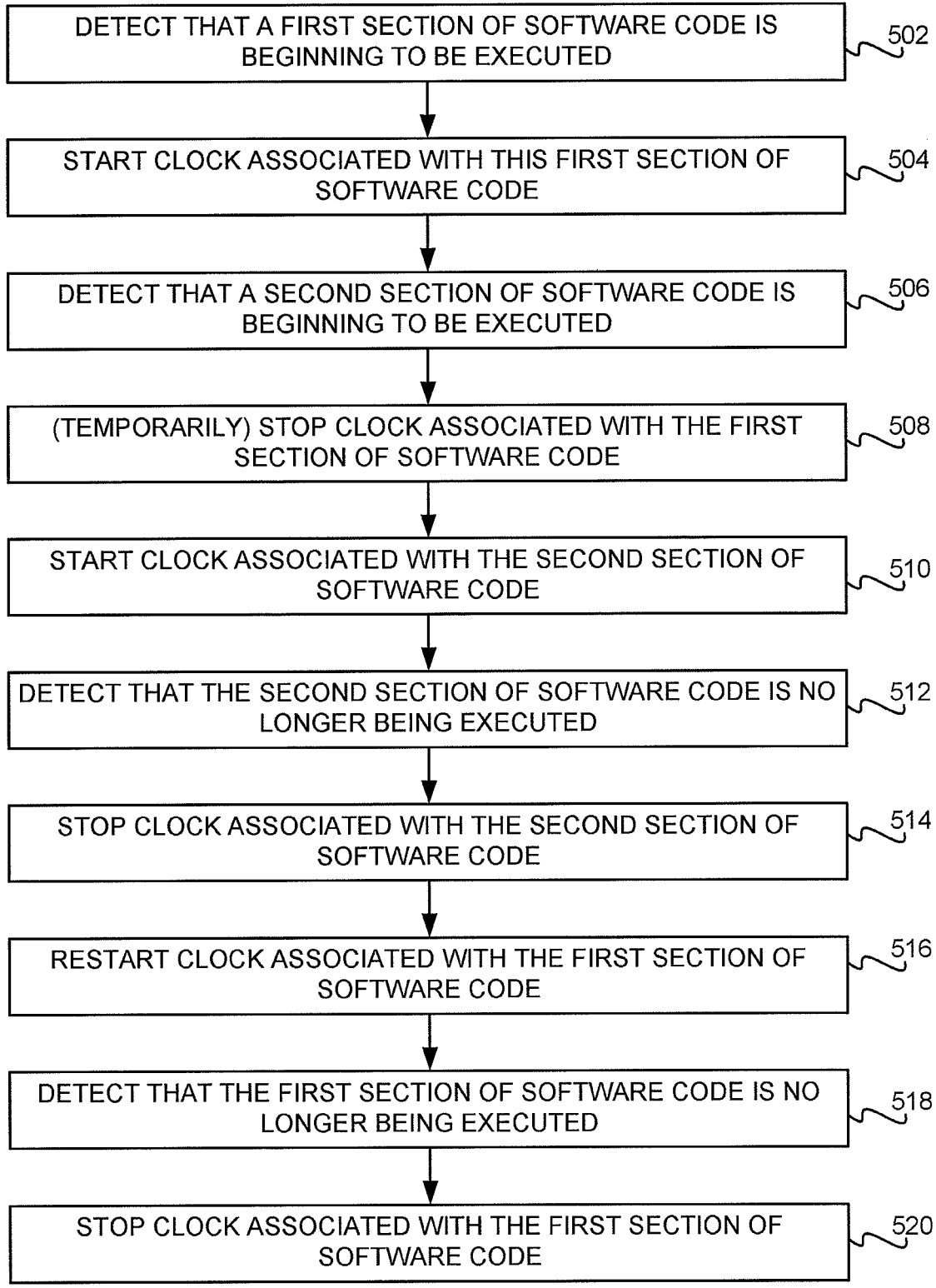
FIG. 5 is a diagram depicting how a number of sections of software code can have processor performance measured by employing the method of FIG. 1 in a nested manner, according to an embodiment of the invention.

Next, FIG. 3 shows an example lookup table 300 that can be used in conjunction with the known absolute beginning address of the computer program encompassing the section of code that has begun to be executed, and the known absolute beginning address of the section of code itself, according to an embodiment of the invention. The lookup table 300 includes a number of entries 306. For each entry, there is an identification field 302 identifying a given section of code or a given program itself, and an offset field 304. In short, the known absolute beginning addresses of the computer program and the section of code are looked up against the offset field 304 to identify the given section of code that has begun to be executed, as identified in the identification field 302.

In particular, the absolute beginning address of the computer program encompassing the section of software code is subtracted from the absolute beginning address of the section of software code itself to yield an offset of the section of software code relative to the beginning of the computer program. This offset is then looked up against the offset field 304 to find a matching entry. For example, the section of software code may have an absolute beginning address of 12,000, where the computer program encompassing this section may have an absolute beginning address of 11,800. By subtracting 11,800 from 12,000, an offset of 200 is yielded, which corresponds to the offset value for the second routine of computer program A in the example table 300.

This basic process is also easily extended to sections of software code that reside within computer programs other than the primary computer program that is being debugged, or whose execution was first initiated. For example, those of ordinary skill within the art can appreciate that in constructing a computer program, the computer program may reference other computer programs so that the functionality provided by these other computer programs does not have to be redeveloped. As such, the computer program may be linked to these other computer programs during the linking process.

Thus, for example, if the section of software code that has begun to be executed has an absolute beginning address of 12,700, and the primary computer program has an absolute beginning address of 11,800, an offset of 900 is yielded. Based on the lookup table 300, this means that the primary computer program A has ceded control in the call instruction to the second routine of computer program B. In this way, the section of software code that has begun to be executed, as detected in part 202 of the method 200 of FIG. 2 can be looked up in part 206 of the method 200.

It is further noted that the lookup table 300 may be generated automatically and/or manually. In one embodiment, once a computer program has been compiled and it is being linked to generate an executable file, the computer program and its linked-to computer programs are automatically scanned for their complete routines to populate the entries 306 of the table 300, as can be appreciated by those of ordinary skill within the art. Thereafter, a user may optionally review the table 300, or data representing the table 300, and remove from the table those entries for the complete routines that he or she is not interested in tracking.

In another embodiment, this process may be basically performed in reverse. For example, a user may identify within source code which complete routines of a computer program are to be tracked, which are then appropriately marked. Once the computer program has been compiled, during the linking process to generate an executable file, the scanning process looks for the markings so that it knows for which complete routines to construct entries 306 within the lookup table 300.

Referring back to FIG. 2, the section of software code that has been called is identified based on the offset lookup achieved in part 206 (208). Therefore, the processor clock associated with this section of software code can be started (106). In the specific embodiment of FIG. 2, detecting that the section of software code is no longer being executed is more easily achieved (108). This is because in this embodiment, it is known that the section of software code in question has an ending address corresponding to the ending address of the complete routine, as has been described. Thus, this means that once (and only in one embodiment) a return instruction has been encountered within the current routine while the current routine is being executed, is the corresponding section of software code no longer being executed and the current iteration thereof no longer will be executed.

Therefore, once such a return instruction from the complete routine in question has been encountered (210), a software interrupt is generated (212), which cedes control to a different section of code implement part 109, where the clock associated with the section of software code is stopped (109). It is noted that the method 200 of FIG. 2 can be performed in a nested manner as to nested sections of software code, as will be described in more detail in a subsequent section of the detailed description. Embodiments of the invention can track which section of software code is currently executing based on which iteration of the method 200 is being performed. Therefore, when a return instruction is encountered in part 210, it can inherently be known which section of software code encompasses this return instruction, so that the lookup and identification process of parts 206 and 208 does not also have to be performed within part 108 as well.

It is further noted that as to part 108 as implemented in the method 200 of FIG. 2 in particular, part 108 may implement just the last time a section of software code is no longer being executed. As has been described, a section of software code may stop and restart a number of times as, for instance, it calls other sections of software code. In this situation, just the last time the current iteration of the section of software code in question stops (such that it does not restart later) is detected in part 108 in the embodiment of FIG. 2, by detecting that a return instruction of the corresponding routine has been detected in part 210. Any other preceding times the current iteration of the section of software code in question stops are detected by detecting that different sections of software have begun to be executed, such as different routines called by the routine in question.

Likewise, as to part 104 as implemented in the method 200 of FIG. 2, the part 104 may implement just the first time a section of software code is executed—i.e., when it has begun to be executed for a new iteration. That is, as implemented in FIG. 2, part 104 may not implement "restarts" of the section of software code in question. Rather, such subsequent starts of the same iteration of a given section of software code are detected by detecting that the different sections of software that were called by the routine corresponding to this given section have returned or ceded control back to the given section of software code. Such stopping and restarting thus occurs when sections of software code reference other sections of software code, such that some sections can be considered as being executed in a nested manner in relation to other sections, as is described in more detail later in the detailed description.

Therefore, in at least some sense, parts 104 and 108 as implemented in the method 200 of FIG. 2 are for detecting when a given iteration of a section of software code is first started, and last stopped. Intermediate stops and restarts of this iteration of this section of software code can be detected via performance of parts 104 and 108 in relation to iterations of other sections of code. For example, when an iteration of a first section of software code calls a second section of software code, the initial execution of this second section is detected via performance of part 104, and such detection corresponds to an intermediate stoppage of the first section of code. When final stoppage of this iteration of the second section of code is detected via performance of part 108, then such detection corresponds to an intermediate restarting of the first section of code.

Second Approach for Detecting When Software Code Section Starts and Stop Executing In the previous section of the detailed description, granularity in measuring the processor performance when executing a section of software code is achieved where the section of code has a beginning address corresponding to the beginning address of a complete routine (as to part 104) and/or where the section of code has an ending address corresponding to the ending address of the complete routine (as to part 108). In many instances, such granularity is what users like developers require. However, especially for relatively long complete routines of a computer program, such granularity may still be insufficient for the purposes of the developers. That is, further granularity may be desired in assessing processor performance.

Therefore, in the embodiment of the invention described in this section of the detailed description, a section of code is arbitrarily specified, such as by a user like a developer. Such arbitrary specification is provided by specifying a given instruction within the computer program that corresponds to the first instruction of a desired section of software code, and by specifying another instruction within the program that corresponds to the last instruction of the desired section of software code. As such, a section of software code does not necessarily have to correspond to a complete routine of a computer program, and instead can correspond to any group of instructions within the computer program.

In one embodiment, this may be achieved during development of the source code for the computer program itself. A user may tag a given instruction as corresponding to the first instruction of a desired section of code to be monitored, and may tag another instruction as corresponding to the last instruction of the desired section of code to be monitored. During the compilation process, a call instruction is added just before the first instruction within the computer program, to call a section of code to start the clock for the desired section of software code. Likewise, a call instruction is added just after the last instruction within the computer program, to call a section of code to stop the clock for the desired section of software code.

FIG. 4 thus shows a method 400 delineating a specific approach for detecting when execution of a software code section has started and when it has stopped, according to this embodiment of the invention. The method 400 particularly shows a specific approach for implementing parts 104 and 108 of the method 100 of FIG. 1. It is noted that in some embodiments, either part 104 and part 108 may be employed as shown in FIG. 4, and not necessarily both parts 104 and part 108 as shown in FIG. 4 may be employed in the same embodiment. For instance, in one embodiment, part 104 may be implemented as in FIG. 2 and part 108 may be implemented as in FIG. 4, whereas in another embodiment, part 104 may be implemented as in FIG. 4 and part 108 may be implemented as in FIG. 2.

The method 400 detects that the desired section of software code is beginning to be executed (104) by simply detecting that the previously added call instruction before the first instruction of the desired section has been encountered (402). That is, when this previously added call instruction is encountered, it temporarily cedes control and execution to a (different) section of software code that starts the clock associated with the desired section of software code (106). Thereafter, control and execution is returned to the desired section of software code.

Likewise, the method 400 detects that the desired section of software code is no longer being executed (and the current iteration thereof will no longer be executed) (108) by simply detecting that the previously added call instruction after the last instruction of the desired section has been encountered (404). That is, when this previously added call instruction is encountered, it temporarily cedes control and execution to a (different) section of software code that stops the clock associated with the desired section of software code (109).

Thus, as in the method 200 of FIG. 2, part 108 as implemented in the method 400 of FIG. 4 may be performed just the last time a given iteration of a desired section of software code is no longer being executed, and not for intermediate stoppages of this iteration of the desired section of software code. That is, if the desired section of software code calls another section of software code, such calling can signify that the desired section is temporarily being stopped. As such, the clock associated with the desired section of software code is temporarily stopped.

Likewise, as in the method 200 of FIG. 2, part 104 as implemented in the method 400 of FIG. 4 may be performed just the first time a given iteration of a desired section of software code is being executed, and not for subsequent restarts of this iteration of the desired section of software code. That is, if the desired section of software code calls another section of software code, such that the clock associated with the desired section is temporarily stopped, return from the called section of software code—ceding and passing control and execution back to the desired section—can signify that the desired section is being restarted. As such, the clock associated with the desired section of software code is restarted.

The embodiment of FIG. 4 is advantageous to that of FIG. 2 because a user can define a desired section of software code in any way desired, so long as the desired section contains a group of instructions. That is, the user is not forced to define sections of software code as corresponding to complete routines of a computer program, as in the embodiment of FIG. 2. Rather, the user can specify any instruction as the first instruction of a given section of software code, and any subsequent instruction as the last instruction of the given section of software code.

However, the embodiment of FIG. 4 may require that the user recompile the source code for the computer program, so that the needed instructions to call code corresponding to parts 106 and 109 are added before the first instruction and after the last instruction, respectively, of the given section of software code. In this respect, the embodiment of FIG. 4 is differentiated from the embodiment of FIG. 2 as well. In the embodiment of FIG. 2, recompilation may not be required.

Rather, identification of the sections of software code (as corresponding to complete routines of a computer program) may be achieved during the linking process, which is generally requires less work on the part of the user and less time to complete than the entire recompilation process.

Furthermore, in the embodiment of FIG. 2, a lookup table, such as that of FIG. 3, is employed so that the identification of a given section of software code beginning execution can be determined. By comparison, in the embodiment of FIG. 4, such a lookup table may not be necessary. For instance, the call instruction added before the first instruction (and optionally the call instruction added after the last instruction) of the software code section in question may itself be able to identify the software code section. A value may be passed by the call instruction, for example, which identifies the software code section whose execution is beginning.

Granularly Measuring Processor Performance of Nested Software Code Sections

As has been alluded to thereof, processor performance can be granularly measured for software code sections that are nested. This enables a user like a developer to assess processor performance in relation to each software code section. For example, consider the rudimentary situation where a first code section calls a second code section. In one embodiment, the processor performance of execution of just the instructions of the first code section can be determined apart from the processor performance of execution of the instructions of the second code section. That is, the execution of the second code section in this scenario is not reflected within the processor performance of the execution of the first code section, which may be desirable. In a different scenario, however, the execution of the second code section can be reflected within the processor performance of the first code section, if desired by the user.

FIG. 4 shows a method 400 that depicts the former scenario of the previous paragraph in which granular measurement of processor performance of execution of both a first software code section and a second software code section is achieved, according to an embodiment of the invention. That the first section of software code is beginning to be executed is detected (502), such as by performing part 104 of the method 200 of FIG. 2 or the method 102 of the method 400 of FIG. 4. As such, a clock associated with this first section of software code is started (504).

Thereafter, it is detected that a second section of software code is beginning to be executed (506), where this second section may be called by the first section, and/or which may be detected again by performing part 104 of the method 200 of FIG. 2 or the method 102 of the method 400 of FIG. 4. As such, in the scenario where a user does not want the processor performance of execution the first software code section to encompass execution of the second software code section, the clock associated with the first software code section is temporarily stopped (508). That is, the beginning of execution of the second section of software code in this situation also signifies that execution of the first section of software code has been temporarily stopped. A clock associated with the second software code section is started (510).

It is then detected that the second section of software code is no longer being executed (and will no longer be executed) (512), where the return instruction of this second section may have been encountered, and/or which may be detected by performing part 108 of the method 200 of FIG. 2 or the method 108 of the method 400 of FIG. 4. As such, the clock associated with the second software code section is stopped (514). Furthermore, if it had been previously temporarily stopped, the clock associated with the first software code section is restarted (516). That is, the ending of execution of the second section of software code in this situation also signifies that execution of the first section of software code has restarted.

Finally, it is detected that the first section of software code is no longer being executed (518). This may be achieved by again by performing part 108 of the method 200 of FIG. 2 or the method 108 of the method 400 of FIG. 4. Therefore, the clock associated with the first section of software code is stopped (520). Thus, a user is able to be provided with a granular measurement of the processor performance just in relation to the instructions of the first section of software code, and a granular measurement of the processor performance just in relation to the instructions of the second section of software code.

Additional Processor Performance Measurement Considerations

Figure 6:
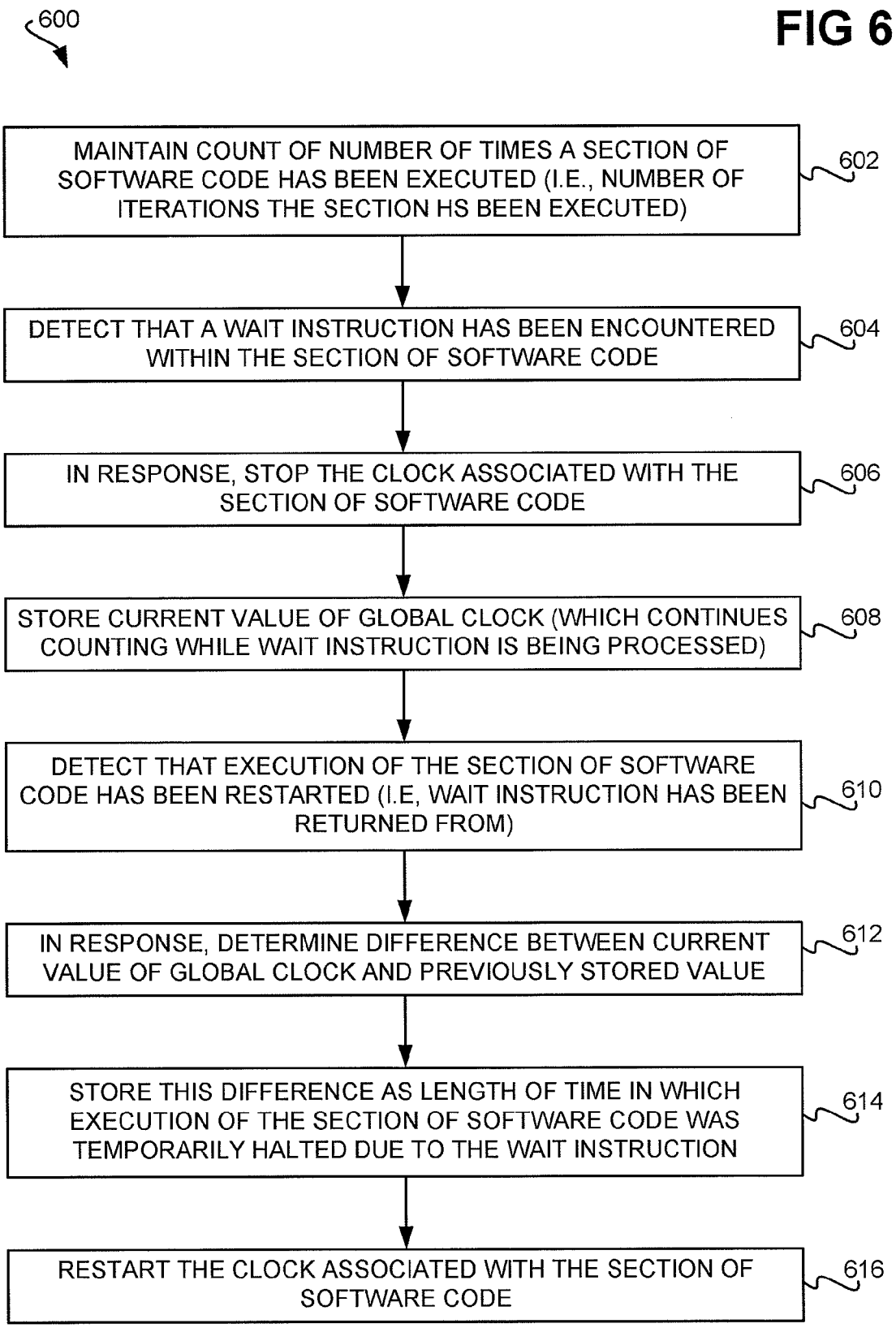
FIG. 6 is a flowchart of a method that can be utilized in addition to the method of FIG. 1 for measuring processor performance in executing a section of software code, according to an embodiment of the invention.

The method 100 of FIG. 1 that has been described can be enhanced with other features in various embodiments of the invention. FIG. 6 shows a method 600 for implementing two such features, according to an embodiment of the invention. First, the count of the number of times a given section of software code has been executed can be maintained (602). That is, the number of iterations a section of software code has been executed can be maintained.

For instance, a given section of software code may be called from its beginning address. Thereafter, the given section of software code may call other sections of software code, such that the given section resumes execution when these other sections of software code return control and execution to the given section of software code. Ultimately, the given section of software code itself returns execution to its caller. Such execution of the given section of software code represents a single time or a single iteration that the given section has been executed.

However, later, the given section of software code may be called again at its beginning address, for a second time or a second iteration. When the given section of software code again returns execution to its caller (which may be the same or a different caller as compared to the first time or the first iteration), it is said that the second time or the second iteration has been completed. Thus, in part 602, the number of times or iterations the given section of software code is executed is maintained. The value of the clock may be output, such as by being stored, in part 112 of the method 100 of FIG. 1, for each time or each iteration of the section of software code.

The second feature implemented by the method 600 is a particular manner by which wait instructions within a given section of software code are handled. A wait instruction informs the processor executing the given section of software code to wait, or delay continuing execution of the section, by a predetermined or a specified length of time. Including this length of time within the time it takes for the processor to execute the given section of software code can thus skew processor performance. At the same time, however, it may be desired to track how long a processor waits when executing such encountered wait instructions within the given section of software code.

Therefore, when a wait instruction is detected within the section of software code (604), by virtue of the wait instruction being encountered within the section of software code upon execution by the processor, the following is performed. First, the clock associated with the section of software code is temporarily stopped (606) to prevent skewing of processor performance. Next, the current value of a global clock is stored (608). The global clock is a different clock than the clock associated with the section of software code. Rather than being a processor clock, for instance, it may be a computing device-wide and/or a system-wide clock. The global clock particularly continues counting even while the wait instruction is being processed.

At some point, the length of time that is to be waited for by processing the wait instruction has elapsed, such that execution of the section of software code continues and is detected (610), by virtue of the wait instruction having returned execution to the next instruction within the section of software code, for instance. In response, the difference between the (new) current value of the global clock and the previously stored value of the global clock is determined (612). This difference is stored as the length of the time in which execution of the section of software code was temporarily halted due to the wait instruction being processed (614).

In one embodiment, where there is more than one wait instruction within the section of software code, the difference determined in part 614 is stored by adding it to any previously stored difference due to the processing of a previous wait instruction within the current iteration of execution of the section of software code. In any case, the stored difference may be output with the value of the processor clock in part 112 of the method 100 of FIG. 1, to provide the user with a more complete picture of processor performance in executing the section of software code. Finally, the processor clock associated with the section of software code is again restarted (616).

System

Figure 7:
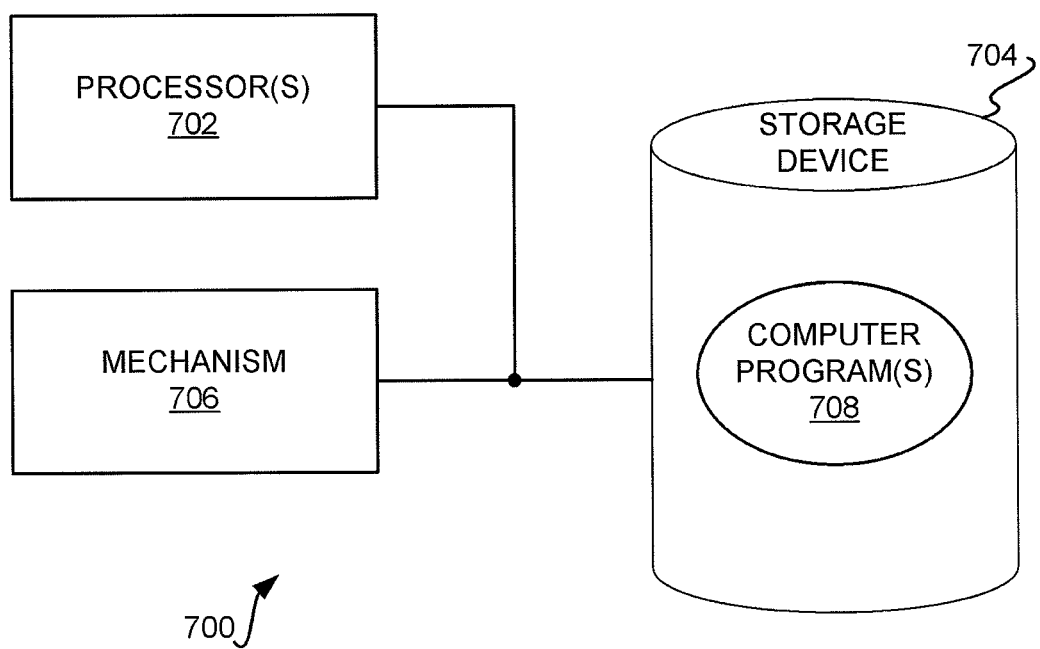
FIG. 7 is a diagram of a rudimentary system, according to an embodiment of the invention.

FIG. 7 shows a rudimentary system 700 that can implement the processor performance measurement approaches that have been described, according to an embodiment of the invention. The system 700 includes one or more processors 702, a storage device 704, and a mechanism 706. As can be appreciated by those of ordinary skill within the art, the system 700 can include other components, in addition to and/or in lieu of those depicted in FIG. 7.

The storage device 704 may be or include a hard disk drive, semiconductor memory, and/or other types of storage devices. The storage device 704 stores one or more computer programs 708. The computer programs 708 contain the sections of software code for which the performance of the processors 702 is to be measured. The mechanism 706 measures the performance of the processors 702 in executing these sections of software code. The mechanism 706 may be implemented in software (i.e., and also executed by the processors 702), in hardware (e.g., such that the mechanism 706 may be said to also include one or more of the processors 702), or in a combination of both software and hardware.

More specifically, for each section of software code, the mechanism 706 maintains a clock corresponding to how long the section of software code has been executed by the processors 702. The mechanism 706 may thus perform the method 100 of FIG. 1 as has been described. In implementing the method 100, the mechanism 706 may further perform the methods 200, 400, 500, and 600 of FIGS. 2, 4, 5, and 6 that have also been described. For instance, in performing the method 200, the mechanism 706 may construct a lookup table like the lookup table 300 of FIG. 3 that has been described.

Conclusion

Embodiments of the invention have been described that measure processor usage information of a specific section of software code without changing or instrumenting the code. Such functionality is not achieved by existing tools and methods within the prior art. For instance, the general practice within the prior art is to measure processor performance for a specific section of code by inserting start and stop clock clocks within the source code for the section of code in question, recompile the code, and then provide the code back to a customer for reinstallation at the customer's location. However, this requires reinstallation of the software code by the customer.

By comparison, embodiments of the invention do not have to modify a specific section of software code in order to measure processor performance. As such, no reinstallation of the software code is needed. While some prior art tools measure processor usage without reinstallation, such prior art tools only function to measure performance for entire processes and programs, and not for specific sections of code. By comparison, embodiments of the invention measure such performance for specific sections of code, without actually having to change or modify the code, which is advantageous as compared to the prior art.

Finally, it is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

I claim:

1. A method for measuring processor performance in executing a section of software code, comprising:

resetting a clock associated with the section of software code;

detecting that the section of software code is beginning to be executed;

in response to detecting that the section of software code is beginning to be executed, starting the clock associated with the section of software code;

detecting that the section of software code is no longer being executed; and, in response to detecting that the section of software code is no longer being executed, stopping the clock associated with the section of software code; and, outputting a value of the clock associated with the section of software code, where the value corresponds to the processor performance in executing the section of software code, wherein the clock is stopped and restarted as the section of software code temporarily stops execution to cede control to a plurality of other sections of software code, wherein the section of software code is a first section of software code, wherein a first clock value is associated with the first section of software code and a plurality of other clock values are associated with the plurality of other sections of software code, detecting that one of the plurality of other sections of software code is being executed;

in response to detecting that the one of the plurality of other sections of software code is being executed, starting one of a plurality of other clocks associated with the one of the plurality of other sections of software code; and in response to detecting that the one of the plurality of other sections of software code stopped executing, restarting the first clock associated with the first section of software code, wherein a user arbitrarily tags the first section of software code at a location independent of any elements within the software code and the user arbitrarily tags each of the plurality of other sections of software code at a location independent of any elements within the software code for monitoring, and wherein the section of software code is detected as the beginning to be executed based on the user tag of the first section of software code.

2. The method of claim 1, further comprising maintaining a count of a number of times the section of software code has been executed, wherein the value of the clock is output for each time the section of software code has been executed.

3. The method of claim 1, further comprising, while the section of software code is being executed, detecting that a wait instruction within the section of software code to temporarily halt execution of the section of software code has been encountered;

in response to detecting that the wait instruction has been encountered, stopping the clock associated with the section of software code;

storing a current value of a global clock that continues counting while the wait instruction is processed, as a stored value of the global clock;

detecting that execution of the section of software code has been restarted, such that the wait instruction has been returned from;

in response to detecting that the execution of the section of software code has been restarted, determining a difference between a current value of the global clock and the stored value of the global clock;

storing the difference as a length of time in which execution of the section of software code was temporarily halted due to the wait instruction; and, restarting the clock associated with the section of software code.

4. The method of claim 1, wherein the section of software code has a beginning address corresponding to a beginning address of a complete routine of a computer program, and wherein detecting that the section of software code is beginning to be executed comprises:

detecting that a call instruction to the complete routine of the computer program has been encountered, the call instruction referencing the beginning address of the complete routine of the computer program;

in response to detecting that the call instruction has been encountered, generating a software interrupt that interrupts calling of the complete routine of the computer program;

in response to generating the software interrupt, looking up the beginning address of the complete routine of the computer program referenced by the call instruction within a previously generated lookup table by adding an absolute beginning address of a primary computer program to an offset within the previously generated lookup table, the previously generated lookup table mapping one or more routines of one or more computer programs to offsets from a relative beginning address of the primary computer program; and, identifying the section of software code being called based on looking up the address of the complete routine of the computer program referenced by the call instruction within the previously generated lookup table.

5. The method of claim 4, wherein the call instruction comprises a branch processor instruction.

6. The method of claim 1, wherein detecting that the first section of software code is beginning to be executed comprises:

detecting that a previously added call instruction has been encountered, the previously added call instruction referencing the second section of software code that starts the clock associated with the first section of software code, wherein the previously added call instruction identifies the first section of software code.

7. The method of claim 1, wherein the section of software code has an ending address corresponding to an ending address of a complete routine of a computer program, and wherein detecting that the section of software code is no longer being executed comprises:

detecting that a return instruction from the complete routine of the computer program has been encountered, the return instruction corresponding to the ending address of the complete routine of the computer program; and, in response to detecting that the return instruction has been encountered, generating a software interrupt that interrupts returning from the complete routine of the computer program.

8. The method of claim 1, wherein the section of software code is a first section of software code, and wherein detecting that the section of software code is no longer being executed comprises:

detecting that a call instruction to a second section of software code has been encountered; and, in response to detecting that the call instruction has been encountered, generating a software interrupt that interrupts calling of the second section of software code.

9. The method of claim 8, wherein the method is also performed for the second section of software code in a nested manner in relation to performance of the method for the first section of software code, such that the method outputs a value of the first clock associated with the first section of software code and a value of second clock associated with the second section of software code.

10. The method of claim 8, further comprising:

detecting that the different section of software code has been returned from, such that the section of software code is again being executed; and, restarting the clock associated with the section of software code.

11. The method of claim 1, wherein the section of software code is a first section of software code, and detecting that the first section of software code is no longer being executed comprises:

detecting that a previously added call instruction has been encountered, the previously added call instruction referencing a second section of software code that stops the clock associated with the first section of software code.

12. The method according to claim 1, wherein the processor performance is measured without instrumentation of existing elements in the software code.

13. The method according to claim 1, wherein the user tags a first instruction of the first section of software code and during a compilation process, a call instruction is added before the first instruction of the first section of the software code tagged by the user to call a section of code to start the first clock.

14. The method according to claim 1, wherein the user tags a last instruction of the first section of software code and during a compilation process, a call instruction is added after the last instruction of the first section of the software code tagged by the user to call a section of code to stop the first clock.

15. The method according to claim 1, wherein the user arbitrarily tags the first section of software code by specifying a first instruction within the software code corresponding to a desired beginning instruction of the first section and a second instruction within the software code corresponding to a desired last instruction of the first section.

16. A system comprising:
one or more processors;
a storage device storing one or more computer programs having one or more sections of software code for which performance of the processors is to be measured; and,
a mechanism to, for each section of software code, maintain a clock corresponding to how long said each section of software code has been executed by the processors,
wherein a section of software code is a first section of software code,
wherein a first clock value is associated with the first section of software code and a plurality of other clock values are associated with a plurality of other sections of software code;
a mechanism to detect that one of the plurality of other sections of software code is being executed and
in response to detecting that the one of the plurality of other sections of software code is being executed, starting one of a plurality of other clocks associated with the one of the plurality of other sections of software code; and
a mechanism to, in response to detecting that the one of the plurality of other sections of software code stopped executing, restarting the first clock associated with the first section of software code,
wherein a user arbitrarily tags the first section of software code at a location independent of any elements within the software code and the user arbitrarily tags each of the plurality of other sections of software code at a location independent of any elements within the software code for monitoring, and
wherein the section of software code is detected as the beginning to be executed based on the user tag of the first section of software code.

17. The system of claim 16, wherein the mechanism is to detect that a given section of software code is beginning to be executed, such that the clock for the given section of software code is reset and started by the mechanism.

18. The system of claim 17, wherein the mechanism is to detect that the given section of software code is beginning to be executed by one of:
detecting that a call instruction to a complete routine of the computer programs has been encountered, where a beginning of the given section of software code corresponds to a beginning of the complete routine;
detecting that a previously added call instruction has been encountered, the previously added call instruction referencing the mechanism and identifying the given section of software code.

19. The system of claim 17, wherein the mechanism is to detect that the given section of software code is no longer being executed, such that the clock for the given section of software code is stopped by the mechanism.

20. The system of claim 19, wherein the mechanism is to detect that the given section of software code is no longer being executed by one of:
detecting that a return instruction from a complete routine of the computer programs has been encountered, where an ending of the given section of software code corresponds to an ending of the complete routine;
detecting that a call instruction to another section of software code of the computer programs has been encountered;
detecting that a previously added call instruction has been encountered, the previously added call instruction referencing the mechanism.

21. The system of claim 19, wherein the mechanism is to detect that the given section of software code is again being executed, such that the clock for the given section of software code is restarted by the mechanism.

22. The system of claim 16, wherein the mechanism is further to maintain a count of a number of times each section of software code has been executed.

23. The system of claim 16, wherein the mechanism is further to detect wait instructions encountered while executing a given section of code, such that a time taken to process the wait instructions is stored but is not reflected within the clock corresponding to how long the given section of code has been executed by the processors.

24. A computer-readable storage medium, the computer readable storage medium not being a signal, having one or more programs stored thereon to perform a method comprising, for each section of software code of a plurality of sections of software code:
resetting a clock associated with the section of software code;
detecting that the section of software code is beginning to be executed;
in response to detecting that the section of software code is beginning to be executed,
starting the clock associated with the section of software code;
detecting that the section of software code is no longer being executed;
in response to detecting that the section of software code is no longer being executed,
stopping the clock associated with the section of software code; and,
outputting a value of the clock associated with the section of software code, where the value corresponds to the processor performance in executing the section of software code,
wherein the clock associated with a given section of software code is different than the clocks associated with a plurality of other sections of software code,
wherein the section of software code is a first section of software code,
wherein a first clock value is associated with the first section of software code and a plurality of other clock values are associated with the plurality of other sections of software code
detecting that one of the plurality of other sections of software code is being executed;
in response to detecting that the one of the plurality of other sections of software code is being executed, starting one of a plurality of other clocks associated with the one of the plurality of other sections of software code; and
in response to detecting that the one of the plurality of other sections of software code stopped executing, restarting the first clock associated with the first section of software code,
wherein a user arbitrarily tags the first section of software code at a location independent of any elements within the software code and the user arbitrarily tags each of the plurality of other sections of software code at a location independent of any elements within the software code for monitoring, and wherein the section of software code is detected as the beginning to be executed based on the user tag of the first section of software code.

* * * * *